W. R. WILSON.
NUT LOCK.
APPLICATION FILED DEC. 11, 1913.

1,089,175.

Patented Mar. 3, 1914.

WITNESSES
Samuel Payne.
Max H. Srolovitz

INVENTOR
W. R. Wilson.
By Henry C. Evert
Att'y.

UNITED STATES PATENT OFFICE.

WALTER R. WILSON, OF PITTSBURGH, PENNSYLVANIA.

NUT-LOCK.

1,089,175.     Specification of Letters Patent.     Patented Mar. 3, 1914.

Application filed December 11, 1913. Serial No. 806,088.

*To all whom it may concern:*

Be it known that I, WALTER R. WILSON, a citizen of the United States of America, residing at Pittsburgh, in the county of Allegheny and State of Pennsylvania, have invented certain new and useful Improvements in Nut-Locks, of which the following is a specification, reference being had therein to the accompanying drawing.

This invention relates to nut locks, and has for its object to provide a device of such class, in a manner as hereinafter set forth, for preventing back rotation of a nut with respect to a bolt and for arresting rotation of the bolt with respect to the nut.

Further objects of the invention are to provide a nut lock, which is simple in its construction and arrangement, strong, durable, efficient in its use, conveniently applied and inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

Figure 1:
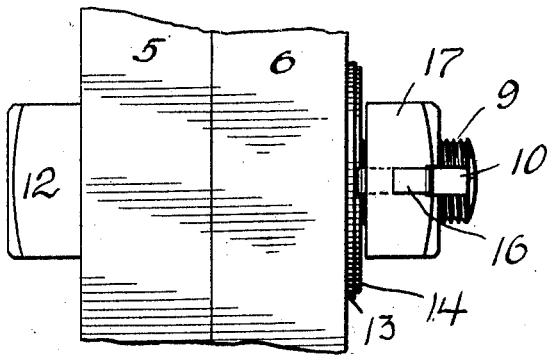
Figure 2:
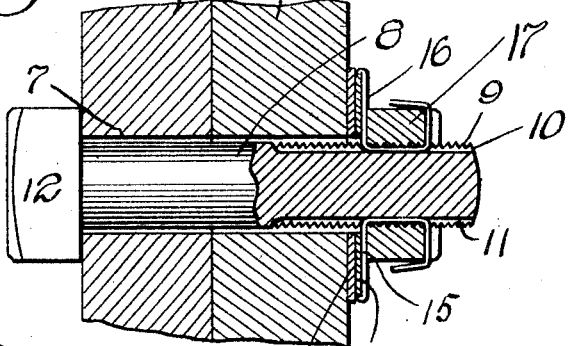
Figure 3:
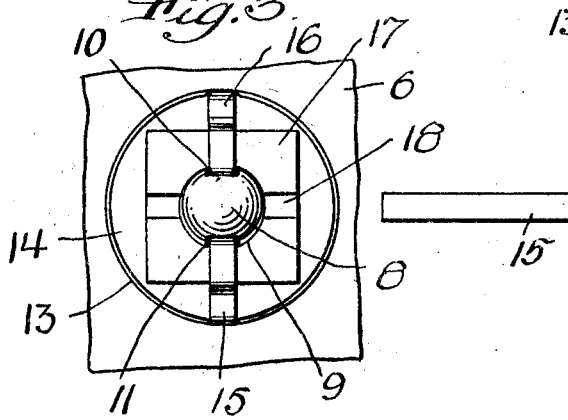
Figure 4:
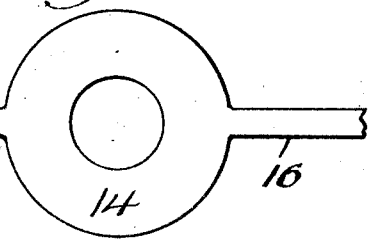

In the drawings, wherein like reference characters denote corresponding parts throughout the several views: Figure 1 is a side elevation of a nut lock in accordance with this invention showing the adaptation therewith in connection with a pair of bars, Fig. 2 is a longitudinal sectional view illustrating the nut lock in accordance with this invention, Fig. 3 is an end view, and Fig. 4 is a plan, broken away of the locking washer.

Referring to the drawings in detail, 5 and 6 denote a pair of bars, each of which is formed with an opening 7, the opening in one bar registering with the opening in the other bar and extending through said registering openings is the shank 8 of a bolt. The shank 8 at one end is formed with peripheral threads 9 and the said threaded portion is provided with a pair of longitudinally extending grooves 10 and 11 arranged diametrically opposite each other.

The reference character 12 denotes the head of the bolt, the said head abutting against the bar 5 while the threaded portion of the shank 8 projects from the bar 6.

Mounted upon the threaded portion of the shank 8 and bearing against the bar 6 is a washer 13, and positioned against the washer 13 is a locking washer 14, the latter having projecting from its outer edge a pair of oppositely disposed bendable retaining arms 15, 16, which are arranged diametrically opposite each other. The arms 15—16 are bent against the outer face of the washer 14 and then furthermore bent to extend in the grooves 10, 11. The length of the arms 15, 16 is such, when the washer 14 abuts against the washer 13, as to project beyond the outer ends of the grooves 10 and 11.

Engaging with the threaded portion of the shank 8 is a nut 17 having its outer face provided with radially disposed grooves 18, which extend from the inner to the outer edge of the nut and preferably are spaced equidistant with respect to each other. The depth of either of the grooves 18 is greater than the thickness of a retaining arm.

When the nut 17 is screwed home to cause the abutting of the arms 15, 16, against the outer face of the washer 14, the remaining portions of the arms 15, 16, are seated in and project from the outer ends of the grooves 10, 11. After the nut 17 has been screwed home to the position stated, the outer portions of the arms 15, 16, are bent to extend through a pair of grooves 18 and then bent to engage a pair of facets of the nut 17.

When the retaining arms 15, 16, abut against the washer 14, seated in the grooves 10, 11, and in a pair of grooves 18 and further engage opposed facets of the nut 17, the latter is prevented from back rotation with respect to the bolt and the bolt is arrested from rotation with respect to the nut.

What I claim is:—

1. A nut lock comprising a grooved bolt, a grooved nut mounted thereon, and a locking washer positioned upon the bolt and having its outer edge provided with a retaining arm extending against the outer face of the washer and through said grooves and engaging a facet of the nut whereby the nut and bolt will be prevented from turning with respect to each other.

2. A nut lock comprising a bolt provided with a plurality of grooves, a nut engaging therewith and formed with a plurality of grooves, and a locking washer positioned upon the bolt and having projecting from its outer edge a pair of bendable retaining arms adapted to be maintained against the outer face of the washer by said nut and further extending through the grooves of the bolt and the grooves of the nut and further engaging a pair of facets of the nut whereby rotation of the nut with respect to the bolt is prevented.

In testimony whereof I affix my signature in the presence of two witnesses.

WALTER R. WILSON.

Witnesses:
N. L. BOGAN,
MAX H. SROLOVITZ.

Copies of this patent may be obtained for five cents each, by addressing the "Commissioner of Patents, Washington, D. C."